(12) United States Patent
Kawatake et al.

(10) Patent No.: US 9,062,365 B2
(45) Date of Patent: Jun. 23, 2015

(54) METHOD OF MANUFACTURING METAL PART

(75) Inventors: Ryuichi Kawatake, Aiko-gun (JP); Takashi Maruyama, Aiko-gun (JP)

(73) Assignee: NHK SPRING CO., LTD., Yokohama-shi, Kanagawa (JP)

(*) Notice: Subject to any disclaimer, the term of this patent is extended or adjusted under 35 U.S.C. 154(b) by 250 days.

(21) Appl. No.: 13/613,693

(22) Filed: Sep. 13, 2012

(65) Prior Publication Data
US 2013/0074992 A1   Mar. 28, 2013

(30) Foreign Application Priority Data

Sep. 22, 2011   (JP) ................................. 2011-207928

(51) Int. Cl.
| | |
|---|---|
| C23C 8/12 | (2006.01) |
| C23C 8/14 | (2006.01) |
| G11B 5/48 | (2006.01) |
| C23C 8/02 | (2006.01) |
| C21D 1/76 | (2006.01) |
| C21D 6/00 | (2006.01) |
| C21D 9/00 | (2006.01) |
| C21D 1/26 | (2006.01) |
| C21D 1/74 | (2006.01) |

(52) U.S. Cl.
CPC ................ *C23C 8/14* (2013.01); *G11B 5/4833* (2013.01); *C23C 8/02* (2013.01); *C21D 1/76* (2013.01); *C21D 6/004* (2013.01); *C21D 9/0068* (2013.01); *C21D 1/26* (2013.01); *C21D 2211/001* (2013.01)

(58) Field of Classification Search
CPC .............. C23C 8/10; C23C 8/12; C23C 8/14; C23C 8/16; C23C 8/18; C21D 6/001; C21D 6/002; C21D 6/004; C21D 2211/001; C21D 1/74; C21D 1/76
See application file for complete search history.

(56) References Cited

U.S. PATENT DOCUMENTS

| | | | | |
|---|---|---|---|---|
| 2002/0117023 | A1* | 8/2002 | Nagata et al. ................... | 75/433 |
| 2006/0086431 | A1* | 4/2006 | Benum et al. ................. | 148/287 |
| 2010/0284111 | A1* | 11/2010 | Yabu et al. .................... | 360/244 |

FOREIGN PATENT DOCUMENTS

| | | |
|---|---|---|
| JP | 10-31872 A | 2/1998 |
| JP | 3563037 B2 | 6/2004 |

* cited by examiner

*Primary Examiner* — Lois Zheng
(74) *Attorney, Agent, or Firm* — Holtz, Holtz, Goodman & Chick PC (57) ABSTRACT

A method of manufacturing a metal part according to the present invention includes heating a shaped product of stainless steel to 600° C. or more in an oxygen-free atmosphere and heat-treating the shaped product in an oxygen atmosphere after the heating.

4 Claims, 8 Drawing Sheets

METHOD OF MANUFACTURING METAL PART

CROSS-REFERENCE TO RELATED APPLICATIONS

This application is based upon and claims the benefit of priority from prior Japanese Patent Application No. 2011-207928, filed Sep. 22, 2011, the entire contents of which are incorporated herein by reference.

BACKGROUND OF THE INVENTION

1. Field of the Invention

The present invention relates to a method of manufacturing a metal part of stainless steel.

2. Description of the Related Art

A hard disk drive (HDD) is used in an information processing apparatus, such as a personal computer. The HDD comprises a magnetic disk rotatable about a spindle, actuator arm, and positioning motor. The actuator arm is configured to be turned transversely relative to tracks of the disk about a pivot by the positioning motor. A suspension is mounted on the distal end portion of the actuator arm.

The suspension comprises a baseplate (or mount plate) secured to the actuator arm, load beam secured to the baseplate directly or by hinge members, and flexure located along the load beam. A slider, which constitutes a magnetic head, is disposed on the distal end portion of the flexure. The baseplate consists of a ferrous metal, such as austenitic stainless steel (e.g., SUS304), and is formed into a predetermined shape by press-forming.

The baseplate of the suspension is formed with a cylindrical boss portion for securing it to an actuator. The baseplate is secured to the actuator arm by inserting the boss portion into a circular mounting hole in the actuator arm and fixing it by fixing means (e.g., Jpn. Pat. Appln. KOKAI Publication No. 10-31872).

As an example of the fixing means, plastic working (ball caulking) is performed such that a hard ball, such as a steel ball, is passed through the boss portion to increase its diameter, whereby the outer peripheral surface of the boss portion is secured to the inner peripheral surface of the mounting hole in the actuator arm. If the press-formed boss portion is work-hardened, its hardness is reduced by performing heat treatment before the ball caulking, as disclosed in Japanese Patent No. 3563037, for example.

With the recent increase in the recording density, the flying height of the head relative to the magnetic disk has been reduced to a very small value, e.g., about 10 nm or less. Thus, the suspension that supports the head requires maintenance of very high cleanliness.

Contaminations to be cleaned up can be classified roughly into three types, particles, organic compounds, and ionic substances. The ionic substances are evaluated by, for example, ion chromatography using an ion-chromatography measuring apparatus. Chlorine ions ($Cl^-$), sulfate ions ($SO_4^{2-}$), nitrate ions ($NO^{3-}$), etc., are conventionally strictly managed according to prescribed standards. Although oxalic acid, which is classified as an organic acid, had not hitherto been questioned, its adhesion to suspensions has become a problem with the reduction in the head flying height.

BRIEF SUMMARY OF THE INVENTION

The present invention provides a method of manufacturing a metal part of stainless steel to which organic acids, especially oxalic acid, cannot easily adhere.

A method of manufacturing a metal part according to the invention comprises heating a shaped product of stainless steel to 600° C. or more in an oxygen-free atmosphere and heat-treating the shaped product in an oxygen atmosphere after the heating.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the accompanying drawings.

Figure 1:
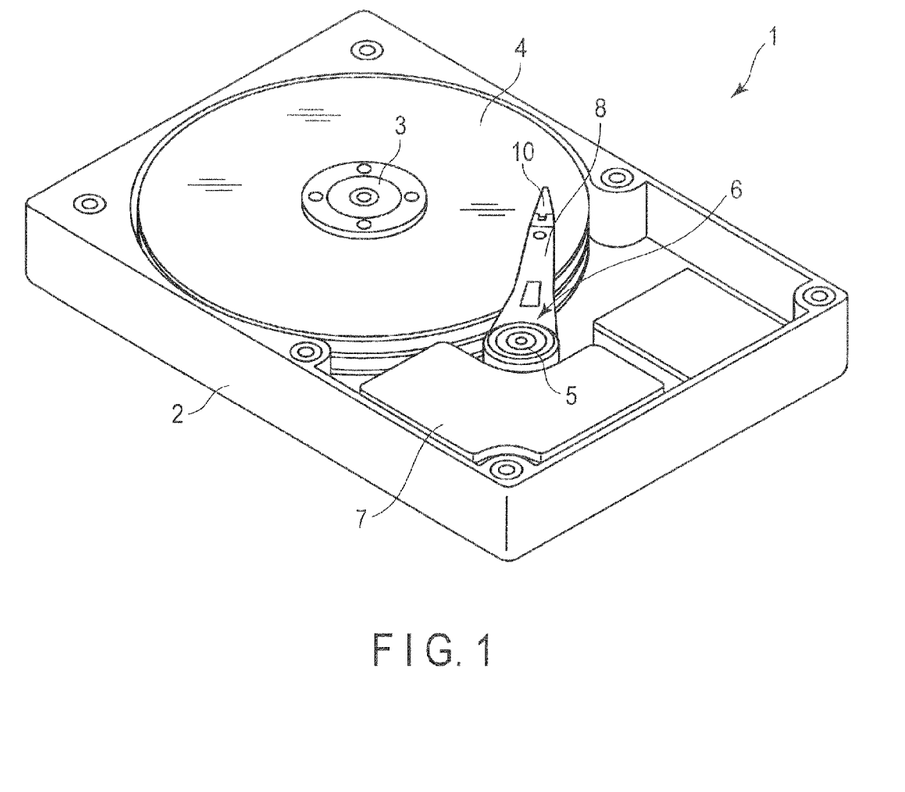
FIG. 1 is a perspective view showing an example of a hard disk drive comprising a metal part manufacturable by a method according to an embodiment.

FIG. 1 is a perspective view showing an example of a hard disk drive comprising a metal part manufacturable by a method according to the embodiment. A hard disk drive 1 shown in FIG. 1 comprises a case 2 disk 4 rotatable about a spindle 3, carriage 6 turnable about a pivot 5, and positioning motor 7 for turning the carriage 6. The carriage 6 comprises an actuator arm 8, to which a suspension 10 is secured. The case 2 is sealed by a lid (not shown).

Figure 2:
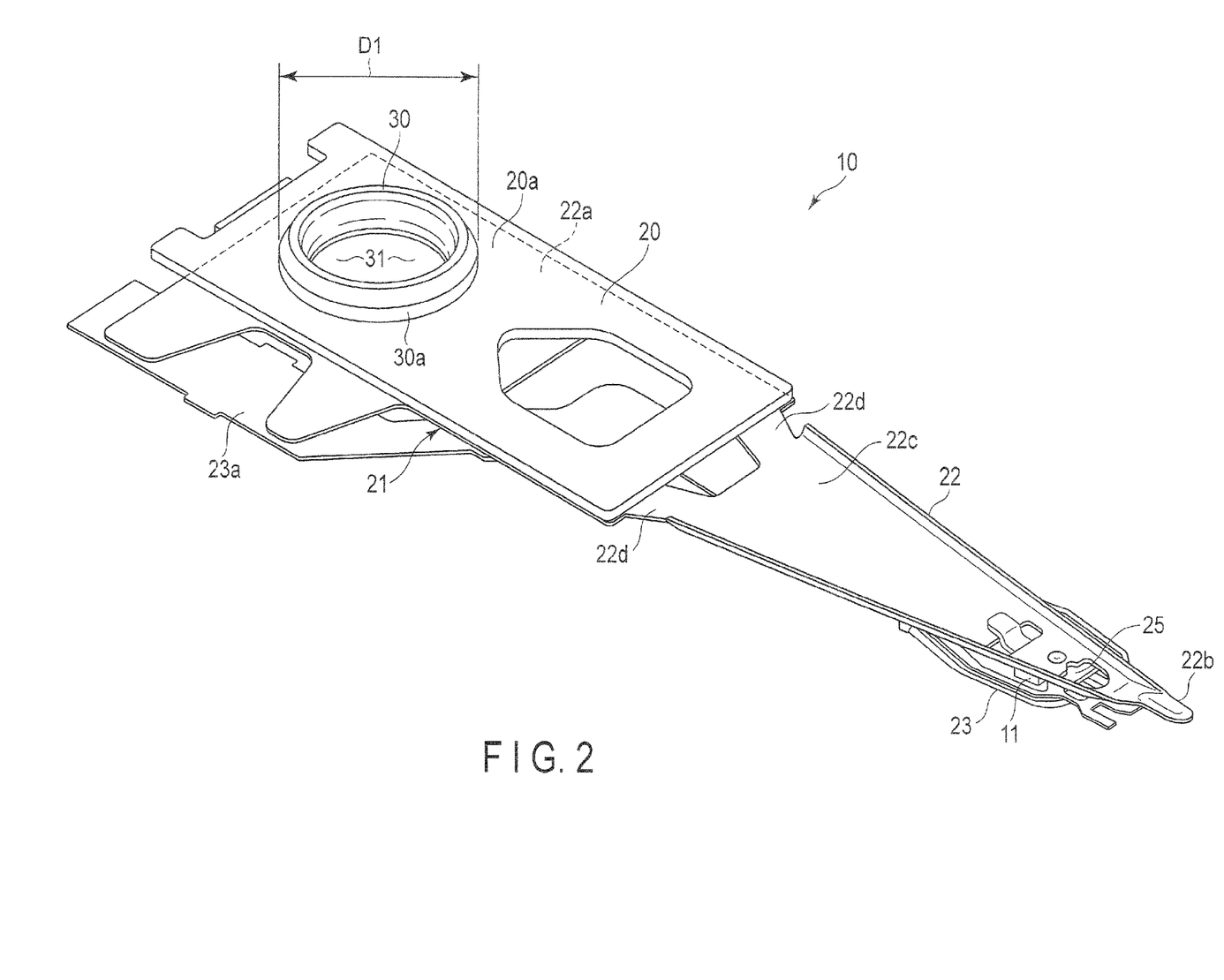
FIG. 2 is a perspective view showing a suspension incorporated in the hard disk drive of FIG. 1.

FIG. 2 is a perspective view showing the suspension incorporated in the hard disk drive shown in FIG. 1. The suspension 10 shown in FIG. 2 comprises a base section 21 including a baseplate 20, load beam 22, and flexure 23 with conductors.

The baseplate 20 comprises a short cylindrical boss portion 30 formed by, for example, press-forming. Further, the baseplate 20 comprises a ball insertion hole 31 that penetrates it along its thickness. The boss portion 30 projects from one surface 20a of the baseplate 20 along its thickness. The baseplate 20 can be made thicker than the load beam 22 and is, for example, about 100 μm thick.

Stainless steel, especially austenitic stainless steel, can be used as the material of the baseplate 20. The austenitic stainless steel may be SUS304, the chemical composition (percent by mass) of which is 0.08 or less carbon, 1.00 or less silicon, 2.00 or less manganese, 8.00 to 10.50 nickel, 18.00 to 20.00 chromium, and iron for the remainder.

The load beam 22 comprises a proximal portico 22a, distal end portion 22b, beam portion 22c between the proximal and distal end portions 22a and 22b, and hinge portions 22d. The proximal portion 22a of the load beam 22 is secured to the baseplate 20 by fixing means, such as laser welding. The load beam 22 is, for example, about 30 to 100 μm thick.

The flexure 23 is located along the load beam 22. A tongue (or gimbal portion) 25 is formed near the distal end portion of the flexure 23, and a slider 11 is attached to the tongue. The slider 11, which serves as a magnetic head, comprises a reading portion, writing portion, etc. As shown in FIG. 2, an extending portion 23a of the flexure 23 extends rearwardly relative to the baseplate 20 from one side portion of the baseplate.

Figure 3:
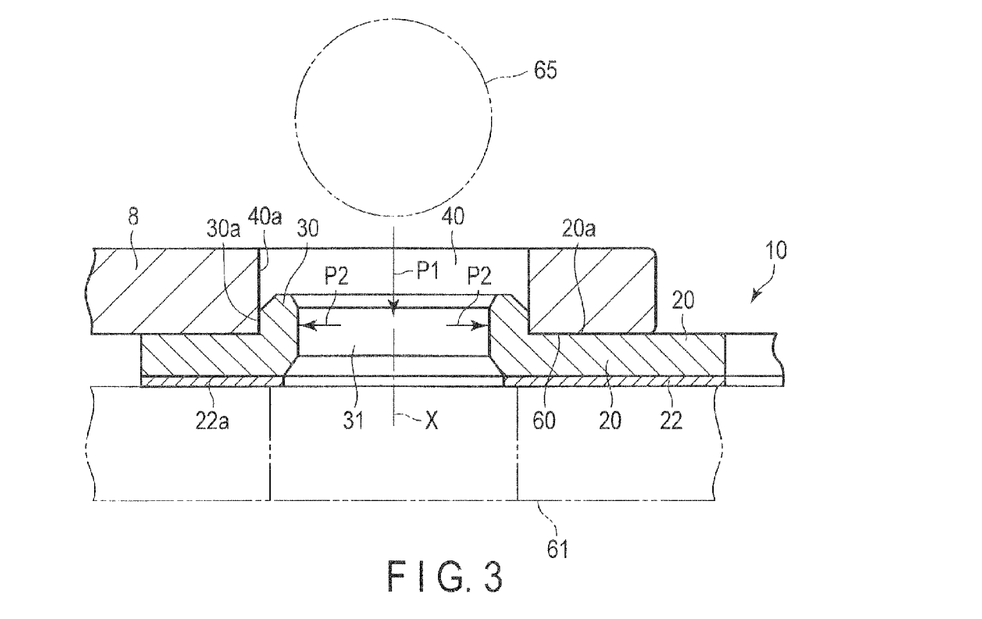
FIG. 3 is a partial sectional view of the suspension shown in FIG. 2.

FIG. 3 is a partial sectional view of the suspension shown in FIG. 2. Specifically, FIG. 3 is a sectional view of that part of the suspension where the actuator arm 8 and the boss portion 30 of the baseplate 20 are connected to each other, taken along the thickness. The boss portion 30 is formed with the ball insertion hole 31 that penetrates it in an X-direction parallel to its axis. The one surface 20a of the baseplate 20 (from which the boss portion 30 projects) is in contact with a baseplate mounting surface 60, and the boss portion 30 of the baseplate 20 is inserted into and secured to a mounting hole 40 in the actuator arm 8.

The boss portion 30 is secured to the mounting hole 40 in the following manner, for example. The boss portion 30 of the baseplate 20 is inserted into the mounting hole 40 of the actuator arm 8 so that the one surface 20a of the baseplate 20 contacts the baseplate mounting surface 60 of the actuator arm 8. Further, the baseplate 20 is supported by a support member 61. In this state, a hard ball 65 such as a steel ball, which serves as a caulking jig, is passed through the ball insertion hole 31 in a direction indicated by arrow P1 along the X-direction. Before the ball 65 is passed through the ball insertion hole 31, the outside diameter (D1, FIG. 2) of the boss portion 30 is slightly smaller than the inside diameter of the mounting hole 40. Therefore, the boss portion 30 can be inserted into the mounting hale 40. The ball 65 consists of a metal harder than the bass portion 30, and its diameter is larger than the inside diameter of the ball insertion hole 31. If the ball 65 is passed through the ball insertion hole 31, therefore, it is plastically deformed in such a direction that the boss portion 30 spreads as indicated by arrow P2 in FIG. 3. In this way, the outer peripheral surface of the boss portion 30 is secured to an inner peripheral surface 40a of the mounting hole 40 of the actuator arm 8. Thus, the boss portion 30 of the first suspension 10 is secured to the lower surface of the actuator arm 8 by ball caulking.

Figure 4:
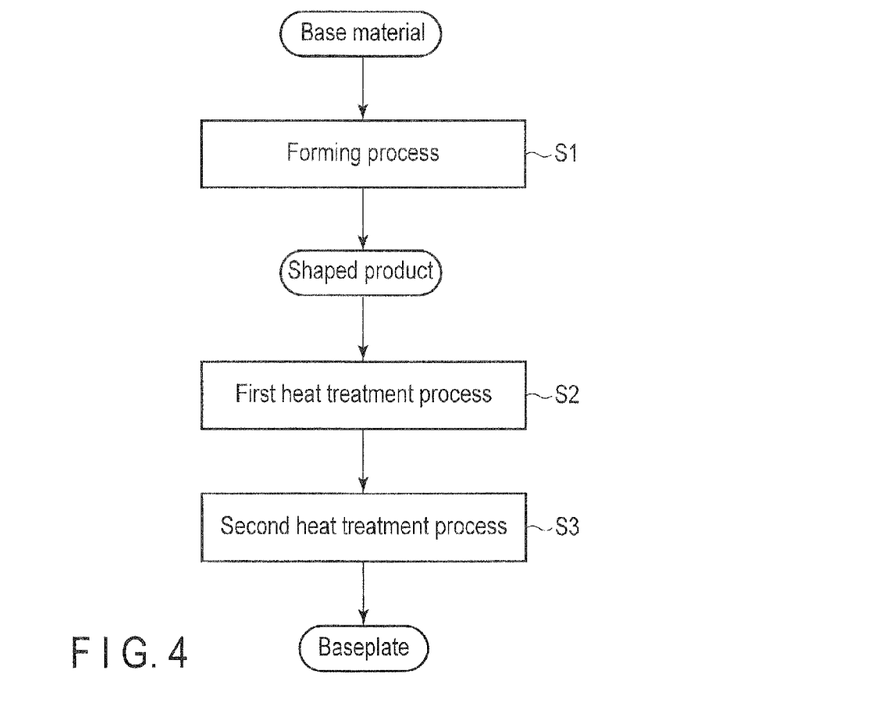
FIG. 4 is a flowchart illustrating the metes part manufacturing method according to the embodiment.

FIG. 4 is a flowchart illustrating the method of manufacturing a metal part according to the embodiment. According to this flowchart, a baseplate as the metal part can be manufactured by successively performing a farming process S1, first heat treatment process S2, and second heat treatment process S3 for a base material.

In the forming process S1, a shaped product is obtained from the base material. In this process, the base material may be, for example, rolled, cut, or polished. Further, the base material may be melted, poured into a specific mold, and solidified again. Furthermore, the base material may be subjected to heat treatment, such as bright annealing.

In the case where the baseplate is manufactured as the metal part by the manufacturing method according to the embodiment, ingot rolling, intermediate annealing (bright annealing), rolling, press-forming, and barrel polishing are successively performed in the forming process S1, for example. In particular, the boss portion 30 and the like are formed by press-forming. The baseplate 20, which consists of austenitic stainless steel, is easily work-hardened. Therefore, the press-formed boss portion 30 and its surroundings are also work-hardened.

Then, the shaped product obtained in the forming process S1 is subjected to the first heat treatment process S2. In the first heat treatment process S2, the shaped product obtained in the forming process S1 is heated to a first temperature of 600° C. or more, e.g., from 800 to 1,200° C., with oxygen cut-off. Typically, in this process, the shaped product is maintained at the first temperature for a fixed time with oxygen cut-off, and thereafter, slowly cooled to a second temperature. The second temperature ranges from the normal temperature to the upper limit of a third temperature (described later). The hardness of the shaped product of stainless steel can be reduced by the first heat treatment process S2. Since this heat treatment is annealing with oxygen cut-off, it is equivalent to bright annealing. Oxidation of the surface of the shaped product can be suppressed by cutting off oxygen. The cut-off of oxygen can be achieved by using a hydrogen furnace or vacuum furnace.

Then, the shaped product subjected to the first heat treatment process is subjected to the second heat treatment process S3. In the second heat treatment process S3, the shaped product subjected to the first heat treatment process is heat-treated in an oxygen atmosphere. In other words, the shaped product is exposed to an oxygen atmosphere at the third temperature. The oxygen atmosphere is an atmosphere containing oxygen, e.g., the atmospheric air. In this way, a passive film is considered to be reformed on the surface of the shaped product. The third temperature may be set to such a value that the surface is oxidized to be stabilized and is not discolored. Specifically, the third temperature may be set to 150 to 300° C., and preferably to 200 to 250° C. The heat treatment time for which the shaped product is kept at the third temperature in an oxygen atmosphere may be suitably set according to other conditions. If the temperature for heat treatment is low, in particular, the heat treatment time should preferably be extended. If the temperature is 150° C., for example, the heat treatment time should preferably be set to 60 minutes or more, and further preferably to 240 minutes or more. If a high temperature is used, in contrast, a certain effect can be obtained despite a short heat treatment time. If the temperature is higher than 200° C., for example, the heat treatment time may be set to 30 minutes.

If the third temperature is higher than the second temperature, the heat treatment in the second heat treatment process involves heating. If the third temperature is lower than the second temperature, the heat treatment in the second heat treatment process may or may not involve heating. For example, the shaped product may be heated to the third temperature in the second heat treatment process when it is cooled to the normal temperature after the first heat treatment process is completed. Alternatively, a passive film may be reformed on the surface of the shaped product by exposing the shaped product to an oxygen atmosphere when the temperature region of 150 to 300° C. is passed as the product is cooled from the temperature of 600° C. or more.

Preferably, the shaped product should not be exposed long to the atmospheric air for the period from the end of the first heat treatment process to the start of the second heat treatment process. It is supposed that the passive film on the surface of the shaped product is damaged, that is, all or part of it is removed, by the first heat treatment process. This is done in order to prevent a non-negligible amount of organic acid from adhering to the surface of the shaped product exposed long to the atmosphere air in that state.

Preferably, moreover, such a treatment should not be performed after the second heat treatment process that the passive film reformed on the surface of the metal part is damaged again. For example, it is not advisable to perform heat treatment in a reducing atmosphere.

The metal part manufactured by the manufacturing method according to the embodiment is not limited to the baseplate and may be an arbitrary part of stainless steel. For example, this method can be used to manufacture metal parts in precision machines and electronic equipment. Specifically, manufacturable metal parts include parts of hard disk drives, especially those parts which are incorporated in suspensions, such as flexures, load beams, etc.

Those metal parts to which organic acids, especially oxalic acid, cannot easily adhere can be obtained by the manufacturing method according to the embodiment. Since the adhesion of organic acids is suppressed with time, quality at the time of production can be maintained for a long period of time. For the improvement of the performance of a hard disk drive, it is particularly important that organic acids cannot easily adhere to parts that require high cleanliness, such as parts of the hard disk drive. Further, the metal part that is manufactured by the manufacturing method according to the embodiment has some flexibility. Thus, subsequent working operations, such ball caulking, can be easily performed.

The following is a description of a possible mechanism of suppression of the adhesion of organic acids by the manufacturing method according to the embodiment.

Normally, stainless steel has a thin passive film on its surface. The passive film is damaged if the shaped product of stainless steel is heated with oxygen cut-off in the first heat treatment process.

A conventional manufacturing method does not comprise at least the second heat treatment process. Therefore, the damage on the passive film on the surface of the obtained metal part is not repaired. If the metal part in this state is kept in the atmospheric air, water and carbon dioxide in the atmospheric air react on its surface, whereupon an organic acid, such as oxalic acid, is formed.

In the manufacturing method according to the embodiment, in contrast, the second heat treatment process is performed subsequent to the first heat treatment process. In the second heat treatment process, a passive film is formed again on the surface of the metal part by heat treatment in an oxygen atmosphere. The reformation of the passive film preferentially occurs on defective portions, so that the formed passive film is uniform. Formation of an organic acid on the surface is suppressed by the presence of the passive film. Thus, organic acids, especially oxalic acid, cannot easily adhere to the surface of the metal part obtained by the manufacturing method according to the embodiment.

EXAMPLES

Example 1

The amount of adhesion of oxalic acid ions to the surface of each of baseplates manufactured by the conventional manufacturing method was examined. The amounts of oxalic acid ions were measured for two types of products A and B immediately after production and after standing for a certain period. With respect to the products A, measurements were performed for lots produced six months ago, three months ago, and two months ago, individually, and a lot fresh from production. With respect to the products B, measurements were performed for lots produced six months ago and three months ago, individually. Two products were measured for each lot.

Figure 5:
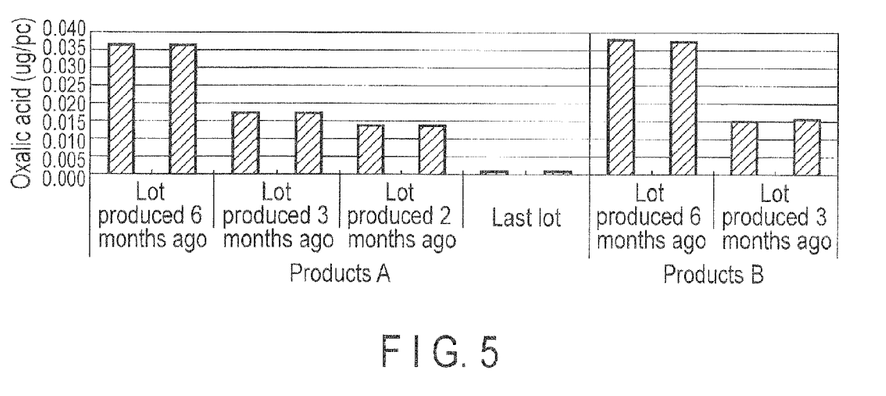
FIG. 5 is a diagram showing change of the amount of adhesion of oxalic acid with time.

FIG. 5 shows the result of the measurements. In FIG. 5, the ordinate indicates the amount of oxalic acid ions ($\mu$g) per product. According to the graph of FIG. 5 for the products A, the older the date of manufacture of the lots, the greater the amount of adhesion of oxalic acid ions is. This indicates that the amount of oxalic acid ions increases with time. Since there is a similar tendency for the products B, moreover, it is evident that such an increase occurs without, regard to differences between products.

Furthermore, it was found that the amount of oxalic acid ions can be reduced to substantially zero by washing the surface with pure water.

Example 2

The amount of adhesion of oxalic acid ions was examined for the case where baseplates manufactured by the conventional manufacturing method were packed by various methods.

The following three types of packages were provided for the baseplates.

Pack shrink: polymeric-film package containing baseplates;

Aluminum shrink: aluminum packing bag containing baseplates; and

Aluminum shrink with gas adsorbent: aluminum package containing baseplates and a gas adsorbent.

The baseplates packed in these three types of packages were left at a temperature of 85° C. and relative humidity of 85% for 50 hours (85/85 test). This test simulates a case where the baseplates are left to stand in the atmospheric air for three months.

Further, two unpacked baseplates (without a shrink) exposed to the atmospheric air were prepared as controls for comparison. One of the baseplates was subjected to the 85/85 test, and the other was not. Both were left to stand in the atmospheric air for 50 hours.

Figure 6:
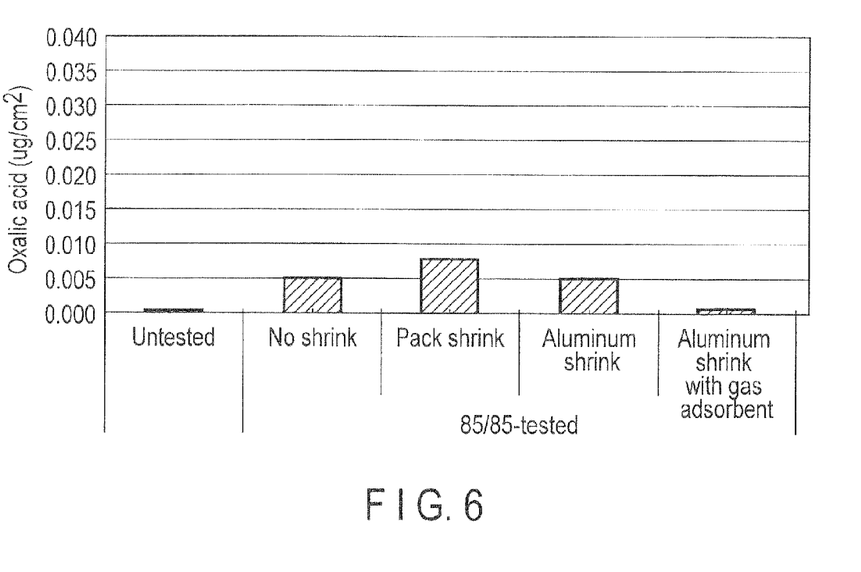
FIG. 6 is a diagram showing the relationship between the packing material and the amount of adhesion of oxalic acid.

The amount of adhesion of oxalic acid ions per surface area was examined for each of these five types of baseplates. FIG. 6 shows the result of this examination.

FIG. 6 indicates that the amount of adhesion is greater in the cases of the "no shrink", "pack shrink", and "aluminum shrink" subjected to the 85/85 test than in the case where the 85/85 test is not performed. It can be seen, on the other hand, that adhesion to the "aluminum shrink with gas adsorbent" can be suppressed to the same degree as in the case where the 85/85 test is not performed.

Accordingly, it is evident that at least the packing methods using the "pack shrink" and "aluminum shrink" are insufficient to counter the adhesion of oxalic acid. Further, the packing method using the "aluminum shrink with gas adsorbent" is disadvantageous in that the use of the gas adsorbent results in an increase in cost, although a certain effect to overcome the adhesion of oxalic acid can be obtained. Furthermore, the original effect of packing can be maintained as long as the baseplates are packed. However, this effect cannot be achieved after the baseplates are taken out of the package when an end user uses the hard disk drive, for example.

Thus, the baseplates manufactured by the conventional manufacturing method cannot effectively avoid adhesion of oxalic acid even if the packing method is properly modified.

Example 3

The amounts of adhesion of oxalic acid to the flexure, load beam, and baseplate that constitutes each suspension were compared. All these three parts consist of stainless steel.

Flexures and baseplates of two types available from different manufacturers were used, while load beams of one type were used. Further, two products were used for each of these five types. All these products were manufactured by the conventional manufacturing method.

Figure 7:
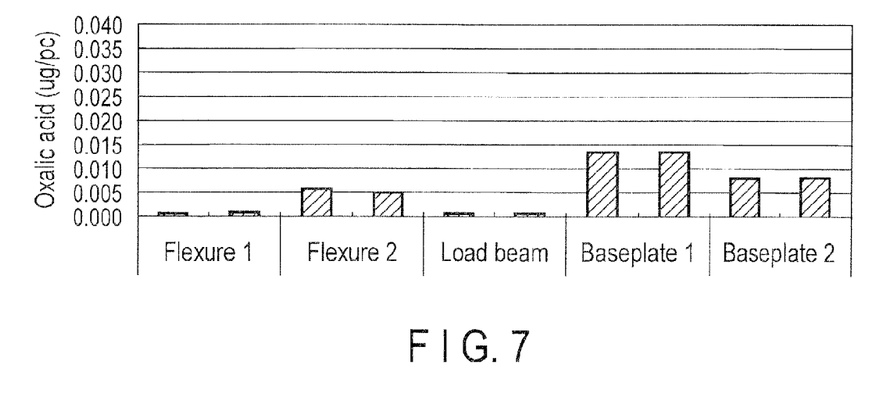
FIG. 7 is a diagram showing the amounts of adhesion of oxalic acid to various parts constituting the suspension.

After the 85/85 test was conducted, the amount of adhesion of oxalic acid ions per product was measured. FIG. 7 shows the result of this measurement. As seen from FIG. 7, the amount of adhesion of oxalic acid ions to each of baseplates is greater than those for the other parts. Although the amount of adhesion to one (flexures 2) of two types of flexures is greater than those for flexures 1 and load beams, it is smaller than those for the baseplates.

Consequently, the baseplates of suspensions were found to be the main source of production of oxalic acid.

Further, there are differences in the amount of adhesion of oxalic acid despite the use of the common material, stainless steel. Therefore, the inventor hereof supposed that the differences in the amount of adhesion are attributable to differences between the manufacturing methods. The following Example 4 was performed based on this supposition.

Example 4

Based on the result of Example 3, it was examined whether or not the differences in the amount of adhesion of oxalic acid between the parts are attributable to differences between the manufacturing methods.

In the conventional baseplate manufacturing method, hydrogen annealing (bright annealing) is performed after ingot rolling, intermediate annealing (bright annealing), rolling, press-forming, and barrel polishing are successively performed. In a conventional load beam manufacturing method, on the other hand, etching is performed after ingot rolling, intermediate annealing (bright annealing), and rolling are successively performed. This etching process comprises baking treatment, that is, heat treatment for a fixed time.

According to the manufacturing methods under comparison, hydrogen annealing is performed as a final stage in the manufacture of baseplates, and baking in the manufacture of load beams. In the manufacture of baseplates, based on this circumstance, the manufacturing method of the present invention was carried out such that baking treatment was additionally performed after a series of treatments was performed according to the conventional manufacturing method. As the baking treatment, heat treatment was performed at 250° C. for four hours.

Further, baseplates manufactured by the conventional manufacturing method were prepared as controls for comparison. As additional controls, load beams were prepared that were additionally subjected to hydrogen annealing after a series of treatments in the conventional load beam manufacturing method.

Figure 8:
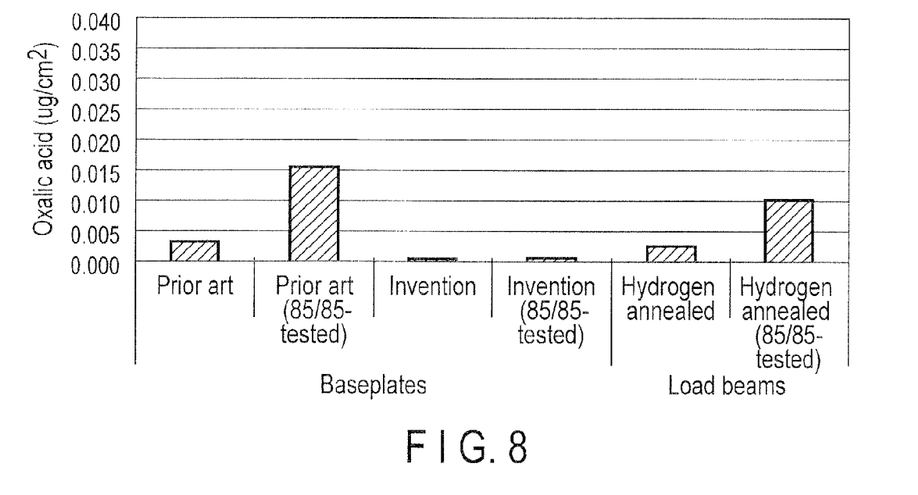
FIG. 8 is a diagram comparatively showing the amounts of adhesion of oxalic acid based on a conventional manufacturing method and the manufacturing method according to the embodiment.

These three types of parts were prepared, including those subjected to the 85/85 test and those not. FIG. 8 shows the result of measurements of the amounts of adhesion of oxalic acid ions to these six parts in total.

In cases (first, second, and fifth cases as counted from the left in FIG. 8) where the 85/85 test was not performed, the amount of adhesion of oxalic acid to the baseplate manufactured by the method of the present invention in which baking was finally performed was found to be smaller than that for the conventional baseplate. Further, the amount of adhesion of oxalic acid ions to the baseplate according to the present invention was also found to be smaller than that for the load beam manufactured by hydrogen annealing.

In cases (third, fourth, and sixth cases as counted from the left in FIG. 8) where the 85/85 test was performed, moreover, the amount of adhesion of oxalic acid to the baseplate according to the present invention was found to be much smaller than those for the conventional baseplate and load beam.

Further, an increase (difference between the second and third cases) in the amount of adhesion to the baseplate of the present invention attributable to the 85/85 test was much smaller than an increase (difference between the first and fourth cases) for the conventional baseplate and an increase (difference between the fifth and sixth cases) for the load beam.

These results indicate, that baseplates free from adhesion of oxalic acid can be manufactured by the manufacturing method according to the present invention.

Example 5

Changes in the valence of the surface metal atom due to variations in baking conditions were examined with respect to the baseplate manufacturing method according to the present invention.

Figure 9A:
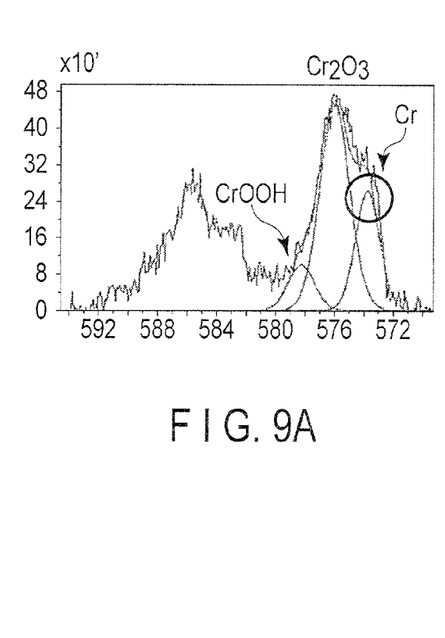
FIGS. 9A, 9B and 9C are diagrams showing the atomic state of chromium in the surface of each baseplate.
Figure 9B:
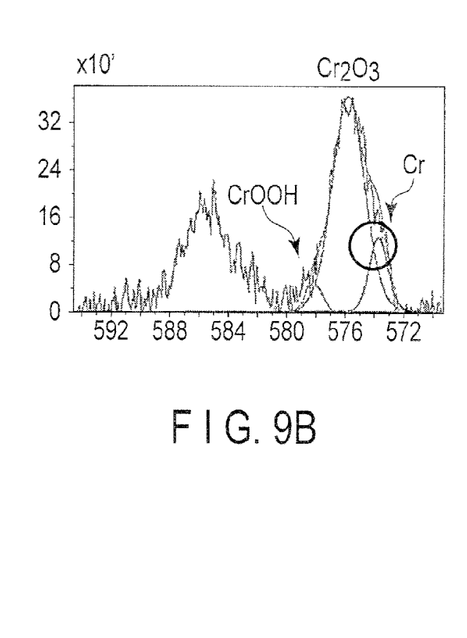
Figure 9C:
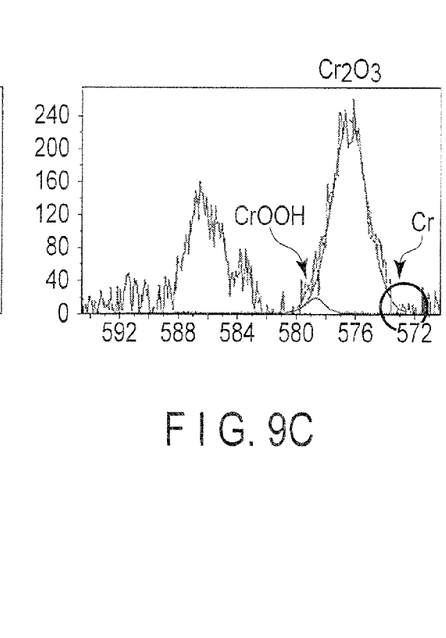

FIGS. 9A, 9B and 9C show results of analysis of the atomic state of chromium in the baseplate surface based on electron spectroscopy for chemical analysis (ESCA). FIG. 9A represents a case where baking was not performed; FIG. 9B represents a case where baking was performed at 200° C. for 30 minutes; and FIG. 9C represents a case where baking was performed at 250° C. for 240 minutes. The abscissa and ordinate of FIGS. 9A, 9B and 9C represent strength and binding energy (eV), respectively.

As seen from FIGS. 9A, 9B and 9C, the amount of zero-valence chromium atoms surrounded by a circle is smaller in the cases were baking is performed (FIGS. 9A and 9B) than in the case where baking is not performed (FIG. 9C). Further, comparison between FIGS. 9B and 9C indicates that the higher the degree of baking, the smaller the amount of zero-valence chromium atoms is.

Figure 10A:
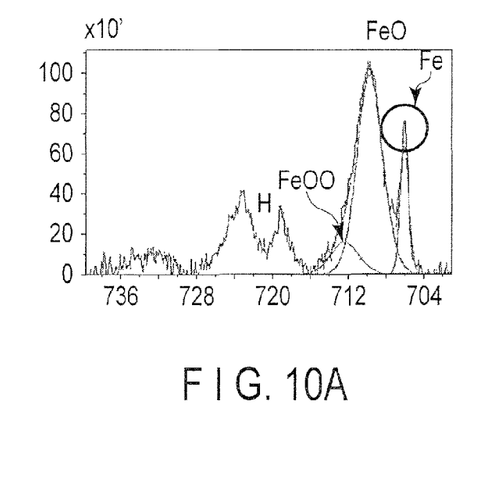
FIGS. 10A, 10B and 10C are diagrams showing the atomic state of iron in the surface of each baseplate.
Figure 10B:
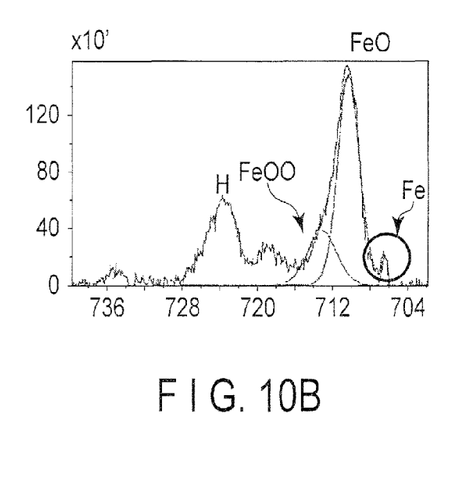
Figure 10C:
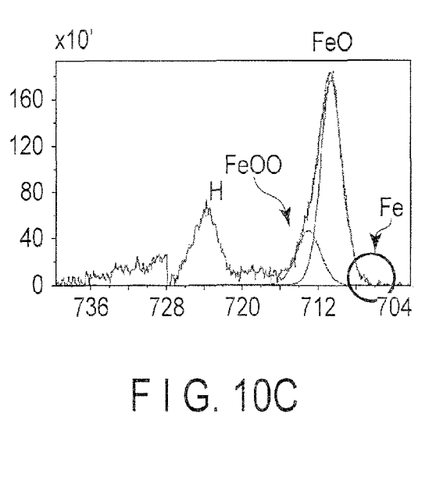

FIGS. 10A, 10B and 10C show the result of analysis of iron atoms, similar to the result shown in FIGS. 9A, 9B and 9C. It is evident that the higher the degree of baking, the smaller the amount of zero-valence iron atoms, like that of chromium atoms, is.

Example 6

Optimum conditions for baking were examined for the baseplate manufacturing method according to the present invention.

Nine types of baseplates were manufactured based on nine treatments in total, using treatment temperatures of 150, 200, and 250° C. and treatment times of 30, 60, and 240 minutes as baking conditions. The 85/85 test was performed and the amount of adhesion of oxalic acid was measured for each of these baseplates.

As controls for comparison, moreover, baseplates manufactured by the conventional manufacturing method were prepared, including those subjected to the 85/85 test and those not, and the amount of oxalic acid was measured for each of the baseplates.

Figure 11:
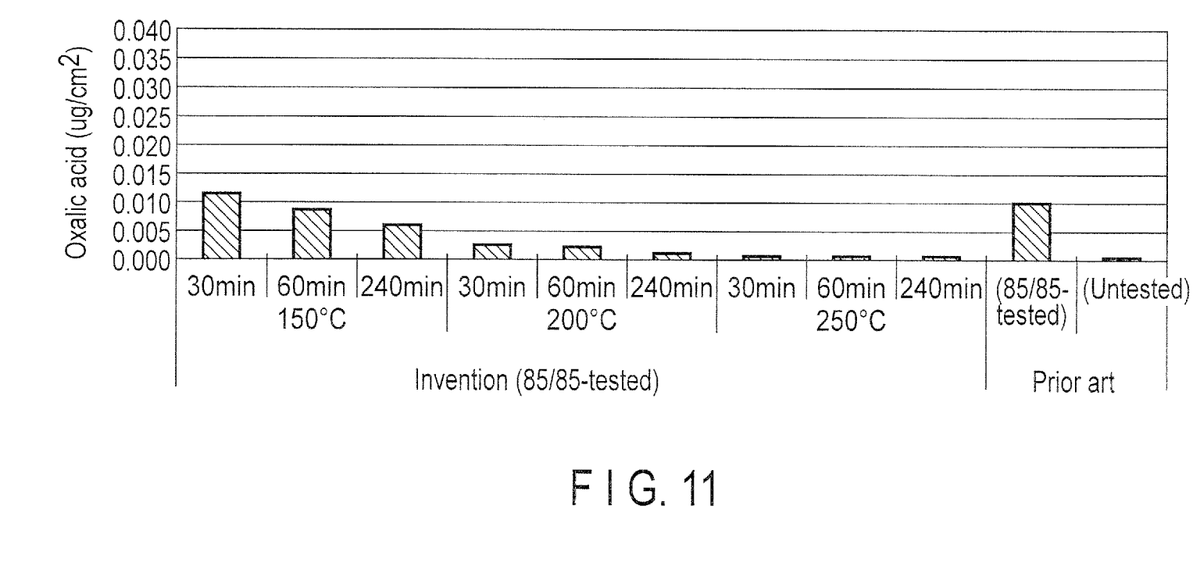
FIG. 11 is a diagram showing the relationship between the amount of adhesion of oxalic acid and treatment conditions.

FIG. 11 shows the result of this measurement. In FIG. 11, three cases with the treatment temperature of 150° C., three cases with 200° C., and three cases with 250° C. are arranged from left to right in FIG. 11, and three cases with the treatment times of 30, 60, and 240 minutes are arranged from left to right for each temperature. Further, two bars on the right-hand side of FIG. 11 represent results on baseplates manufactured by the conventional manufacturing method.

The comparison in temperature indicates that the higher the temperature, the higher the effect of preventing adhesion of oxalic acid is. Further, the comparison in time indicates that the longer the time, the higher the preventive effect is. If the temperature is 150° C., the treatment time of 30 minutes cannot produce a sufficient effect that can be obtained with the conventional manufacturing method. Despite the temperature of 150° C., however, a certain effect can be achieved by extending the treatment time. It is evident, moreover, that the treatment time of 30 minutes can produce a sufficient effect if the temperature is 250° C.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a suspension part mountable on an actuator arm of a disk drive, the method comprising:
   (i) obtaining a press-formed product for the suspension part by press-forming an austenitic stainless steel plate;
   (ii) heating the press-formed product to at least 600° C. in an oxygen-free atmosphere; and
   (iii) heat-treating the press-formed product at a temperature of 150 to 300° C. in an oxygen atmosphere after the heating step (ii), thereby generating a passive film on a surface on the press-formed product.

2. The method of claim 1, wherein the heat-treating step (iii) is performed at a temperature of 200 to 250° C.

3. The method of claim 1, wherein the heating step (ii) is performed in a hydrogen furnace or a vacuum furnace.

4. The method of claim 1, wherein the suspension part is a baseplate.

* * * * *